US011983213B2

(12) United States Patent
Burriesci et al.

(10) Patent No.: US 11,983,213 B2
(45) Date of Patent: May 14, 2024

(54) IDENTIFYING CLUSTERS OF SIMILAR SENSORS

(71) Applicant: Arundo Analytics, Inc., Houston, TX (US)

(72) Inventors: Matthew Strecker Burriesci, Half Moon Bay, CA (US); Martin Lee, Sunnyvale, CA (US)

(73) Assignee: Arundo Analytics, Inc., Houston, TX (US)

( * ) Notice: Subject to any disclaimer, the term of this patent is extended or adjusted under 35 U.S.C. 154(b) by 0 days.

(21) Appl. No.: 18/092,233

(22) Filed: Dec. 31, 2022

(65) Prior Publication Data

US 2023/0144196 A1 May 11, 2023

Related U.S. Application Data

(63) Continuation of application No. 15/489,745, filed on Apr. 18, 2017, now Pat. No. 11,580,151.

(51) Int. Cl.
*G06F 11/30* (2006.01)
*G06F 16/28* (2019.01)
*G06F 16/35* (2019.01)
*G06F 16/41* (2019.01)
*G06F 16/783* (2019.01)

(52) U.S. Cl.
CPC ............ *G06F 16/41* (2019.01); *G06F 16/285* (2019.01); *G06F 16/355* (2019.01); *G06F 16/783* (2019.01)

(58) Field of Classification Search
CPC ...................................... G06F 16/41
See application file for complete search history.

(56) References Cited

U.S. PATENT DOCUMENTS 11,580,151 B2 * 2/2023 Burriesci .............. G06F 16/783
2018/0189647 A1 * 7/2018 Calvo ...................... G06N 3/08

* cited by examiner

*Primary Examiner* — Phuong Huynh
(74) *Attorney, Agent, or Firm* — The Emanuelson Firm, P.C.; Kenneth T. Emanuelson

(57) ABSTRACT

A system and method including receiving sets of sensor data associated with sensors configured to monitor one or more systems. Sensor fingerprints are generated for each set of sensor data based on the sensor data. At least one proximity value is computed for each sensor by comparing the fingerprint of that sensor with another fingerprint. Clusters of similar sensors are identified based at least upon the proximity values of the sensors.

8 Claims, 6 Drawing Sheets

IDENTIFYING CLUSTERS OF SIMILAR SENSORS

A. BACKGROUND

The invention relates generally to identifying clusters of similar sensors, and more particularly to identifying clusters of similar sensors based on sensor fingerprints.

Industrial and commercial systems and facilities, such as oil rigs, power plants, manufacturing factories, mining operations, chemical plants, and the like utilize sensors to monitor the operations of the various subsystems that make up the systems. Equipment hierarchies may be used to keep an inventory of the equipment that form the subsystems. System operators may rely on the equipment hierarchies and intensive manual classification to match similar sensors in connection with the maintenance of the systems. Matching sensors by hand is a laborious process that takes time but also relies on the accuracy of the equipment hierarchies.

B. SUMMARY

In one respect, disclosed is a computer-implemented method. A set of sensor data is received. The set of sensor data is associated with a sensor that is configured to monitor equipment. A sensor fingerprint is generated for the sensor based at least in part on the set of sensor data. At least one proximity value is computed for the sensor based at least upon comparing the sensor fingerprint to another fingerprint. A similarity cluster is identified for the sensor based at least upon the at least one proximity value for the sensor.

In another respect, disclosed is a system that includes one or more processing units and one or more memory units coupled to the one or more processing units. The one or more memory units are configured to store instructions, and the one or more processing units are configured to execute the instructions causing the system to perform operations including receiving a set of sensor data associated with a sensor that is configured to monitor equipment. A sensor fingerprint is generated for the sensor based at least in part on the set of sensor data. At least one proximity value is computed for the sensor based at least upon comparing the sensor fingerprint to another fingerprint. A similarity cluster for the sensor is identified based at least upon the at least one proximity value for the sensor.

In yet another respect, disclosed is at least one non-transitory, machine-accessible storage medium having instructions stored thereon. The instructions are configured, when executed on a machine, to cause the machine to perform operations including receiving a set of sensor data associated with a sensor that is configured to monitor equipment. A sensor fingerprint is generated for the sensor based at least in part on the set of sensor data. At least one proximity value is computed for the sensor based at least upon comparing the sensor fingerprint to another fingerprint. A similarity cluster is identified for the sensor based at least upon the at least one proximity value for the sensor.

In yet another respect, disclosed is a computer-implemented method including receiving sets of sensor data associated with a plurality of sensors. Each set of sensor data is associated with a corresponding sensor from the plurality of sensors, and the plurality of sensors is configured to monitor one or more pieces of equipment. Sensor fingerprints are generated, where each sensor fingerprint is associated with a corresponding sensor from the plurality of sensors, based at least in part on the sets of sensor data. At least one proximity value is computed for each sensor based at least upon comparing one of the sensor fingerprints corresponding to the first sensor to another sensor fingerprint. Clusters of similar sensors are identified based at least upon the proximity values of the sensors.

Numerous additional embodiments are also possible.

C. BRIEF DESCRIPTION OF THE DRAWINGS

Other objects and advantages of the invention may become apparent upon reading the detailed description and upon reference to the accompanying drawings.

Figure 1:
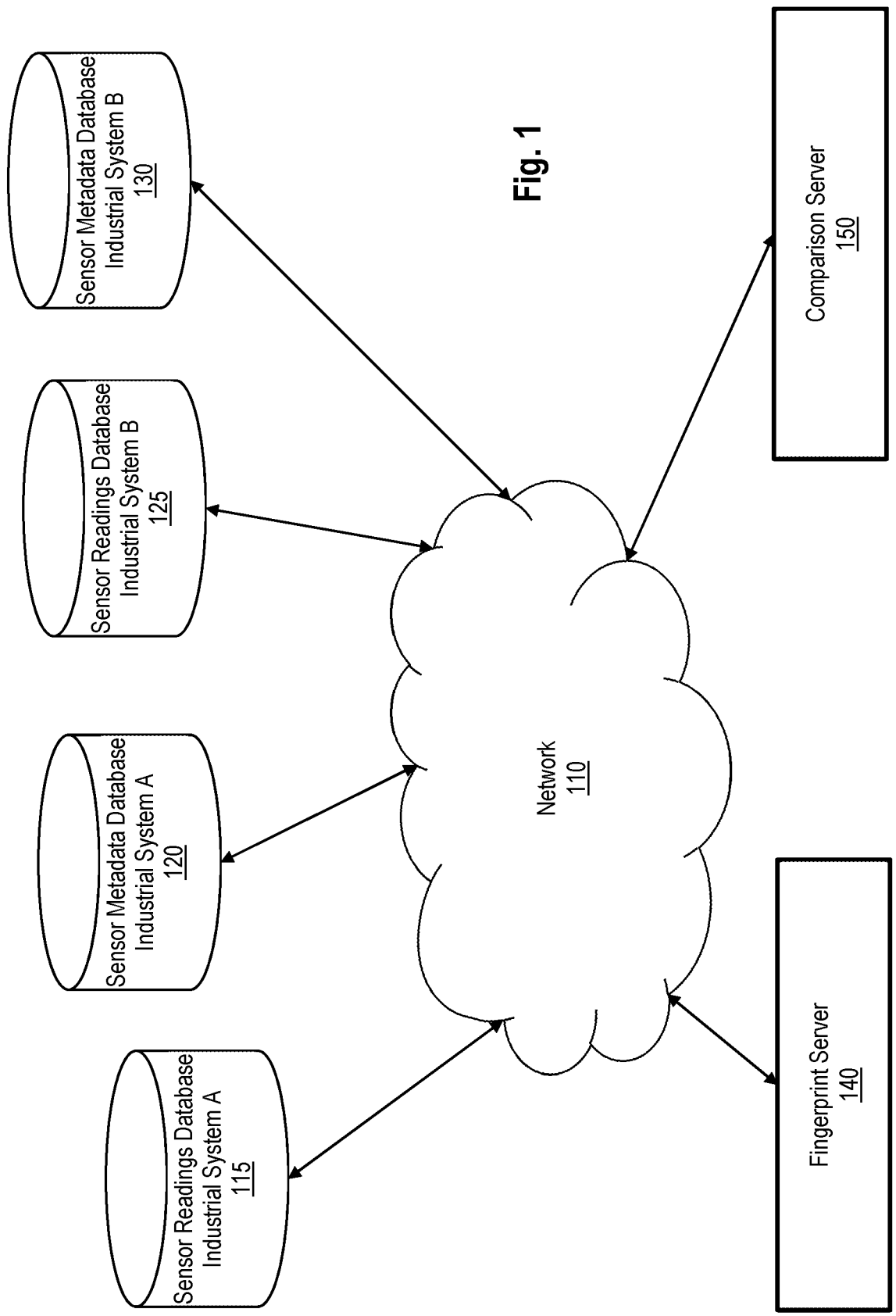
FIG. 1 is a block diagram illustrating a system for identifying clusters of similar sensors, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

D. DETAILED DESCRIPTION

Disclosed below are various concepts related to, and embodiments of, systems and methods for automatically detecting similarities between sensors in order to identify and match sensors of a similar nature and type.

FIG. 1 is a block diagram illustrating a system for identifying clusters of similar sensors, in accordance with some embodiments. In some embodiments, the sensors may be part of industrial systems. Industrial systems may include one or more separate systems. The separate systems may be located at the same or different geographical sites. For example, the industrial system may include multiple oil rigs with each oil rig being a separate system. Alternatively, the separate systems may be separate subsystems of a single industrial system. For example, the industrial system may be a single oil rig, and the separate systems are subsystems of the oil rig, such as the platform subsystem and drilling subsystem. In the illustrated embodiment, the industrial system includes two separate systems, System A and System B.

In some embodiments where there are separate systems, one or more of the separate systems may be a "known" system that can be used as a reference system as discussed in more detail below.

Sensor readings data for Systems A and B may be obtained from sensor readings database 115 associated with System A and sensor readings database 125 associated with System B. Sensor readings data may include various readings, signals, or other data received from the sensor such as temperature, pressure, liquid flow rate, resistance, voltage, current, etc. The sensor readings data contained in sensor readings database 115 includes output from the sensors monitoring System A and sensor readings database 125 includes output from the sensors monitoring System B. Sensor readings databases 115 and 125 may also contain other production or condition data from the systems. In some embodiments, sensor readings databases 115 and 125 include historical data and utilize operational historian database software applications to manage the data. Operational historians may generally be used to record trends and historical process data for the systems for future reference. The operational historians may be configured to capture sensor readings data, as well as other system information about production status, performance monitoring, quality assurance, tracking and genealogy, and product delivery with enhanced data capture, data compression, and data presentation capabilities.

Sensor metadata for Systems A and B may be obtained from sensor metadata database 120 associated with System A and sensor metadata database 130 associated with System B. The sensor metadata contained in sensor metadata database 120 includes metadata related to the sensors monitoring System A and sensor metadata database 130 includes metadata related to the sensors monitoring System B. Sensor metadata generally includes information about the sensors. This may include various text labels and keywords such as sensor names, manufacturer, model numbers, product descriptions, or any other information that describe the sensors. Sensor metadata may also include information that helps manage the sensors, such as installation or service dates, hierarchical information, error messages, or operational log entries.

Although single sensor readings and metadata databases are shown in FIG. 1 for Systems A and B, multiple databases may be used to store the sensor readings data and metadata for Systems A and B.

Sensor data may be obtained through querying using SQL or another suitable database querying language or through an API that pulls data, such as timepoints or ranges of timepoints. It can be returned in ASCII or another suitable human-readable format or encoded in a defined machine-readable format. The data is made available in the system memory (such as RAM) of the database to be transmitted over a network for further processing. In the system memory, non-human readable, compressed, or even encrypted entries can be inflated and/or decrypted for further use.

Returning to FIG. 1, network 110 may be used to transmit sensor data from sensor readings databases 115 and 125 and sensor metadata databases 120 and 130 to fingerprint server 140. Network 110 can be any suitable type of network allowing transport of data communications across it. For example, network 110 may be a local area network (LAN), wide area network (WAN), the internet, a SCADA network, a wireless network or any other communication network, or any combination thereof. In some embodiments, the sensor readings and metadata databases and the fingerprinting server may be located at the same site or even on the same physical machine, in which case the information can be shared between programs in system memory without need for a network. The sensor data can be compressed and/or encrypted for transmission to the fingerprint server. While one fingerprint server is shown, multiple fingerprint servers may be used in some embodiments.

The sensor readings data and sensor metadata received by fingerprint server 140 are processed and transformed so that they can be used to fingerprint the sensors of Systems A and B. The fingerprints include representative characteristics of the sensor data that characterize the sensors and the corresponding equipment being monitored by the sensors. In some embodiments, fingerprint server 140 can transform the sensor readings data by using various mathematical functions and operations to detect representative characteristics or patterns contained within the sensor readings data. Examples of mathematical operations include taking the mean, mode, max, or other summarizing arithmetic functions. These operations can involve taking samples of the data at set intervals or around times of interest, such as during a specific phase of operation. Periodic patterns may be detected using Fourier transforms, Haar wavelet transforms, or other harmonic analysis techniques.

In some embodiments, the representative characteristics detected through the various mathematical operations performed by fingerprint server 140 include sharp spikes, sharp drops, minima, maxima, ranges, periodicity or other daily, weekly, or yearly patterns. All such patterns are captured and are represented in the fingerprint generated by the fingerprint server.

The sensor metadata received at fingerprint server 140 may also be processed using text analysis or other metadata analysis techniques to detect unique or informative words or other representative characteristics or patterns contained within the sensor metadata that characterize the sensors. Where the metadata space is a reasonably constrained (i.e., if there are a limited number of words to consider), then using a standardized dictionary with frequency counts may be sufficient. If, on the other hand, the metadata is more free-text in nature (such as long descriptions of installations or errors), a most frequent informative word and count may be more suitable. Alternatively, more sophisticated natural language processing techniques, such as latent semantic structure analysis, may be employed in cases where the metadata space is more complex.

In some embodiments, the portion of the fingerprint for a sensor computed using the sensor metadata is combined with the portion of the fingerprint for that sensor derived using the sensor readings data to form a fingerprint for the sensor that represents both the sensor's readings data and the sensor's metadata. In other embodiments, the portions of the fingerprints may be maintained as distinct, so that a sensor has a sensor readings fingerprint and a metadata fingerprint.

The fingerprints produced by fingerprint server 140 for the sensors of Systems A and B may be represented in a multidimensional space, where each dimension is defined as a separate characteristic of the sensor, such as the periodicity of the functions produced from the processing of the sensor readings data by the fingerprint server or an informative word or phrase in sensor names or descriptions resulting from the processing of the metadata by the fingerprint server. In some embodiments, the portions of the fingerprint corresponding to metadata may be reduced to numerical values. The multidimensional space may then be defined as an n-dimensional space where the sensor fingerprint for each sensor may consist of n numbers, each number corresponding to a characteristic of the sensor as determined by the readings data, the metadata, etc. Accordingly, each fingerprint may be represented as a point in n-dimensional space of n sensor characteristics. In some embodiments, the numbers may be real numbers. In other embodiments, the numbers may also be complex numbers.

The fingerprints generated by fingerprint server 140 may be transmitted via network 110 to comparison server 150. The comparison server determines similarities between the fingerprints, which can be used to identify relationships between the sensors and classify the sensors as belonging to the same or different groups. The operation of the comparison server is more fully described below.

Figure 2:
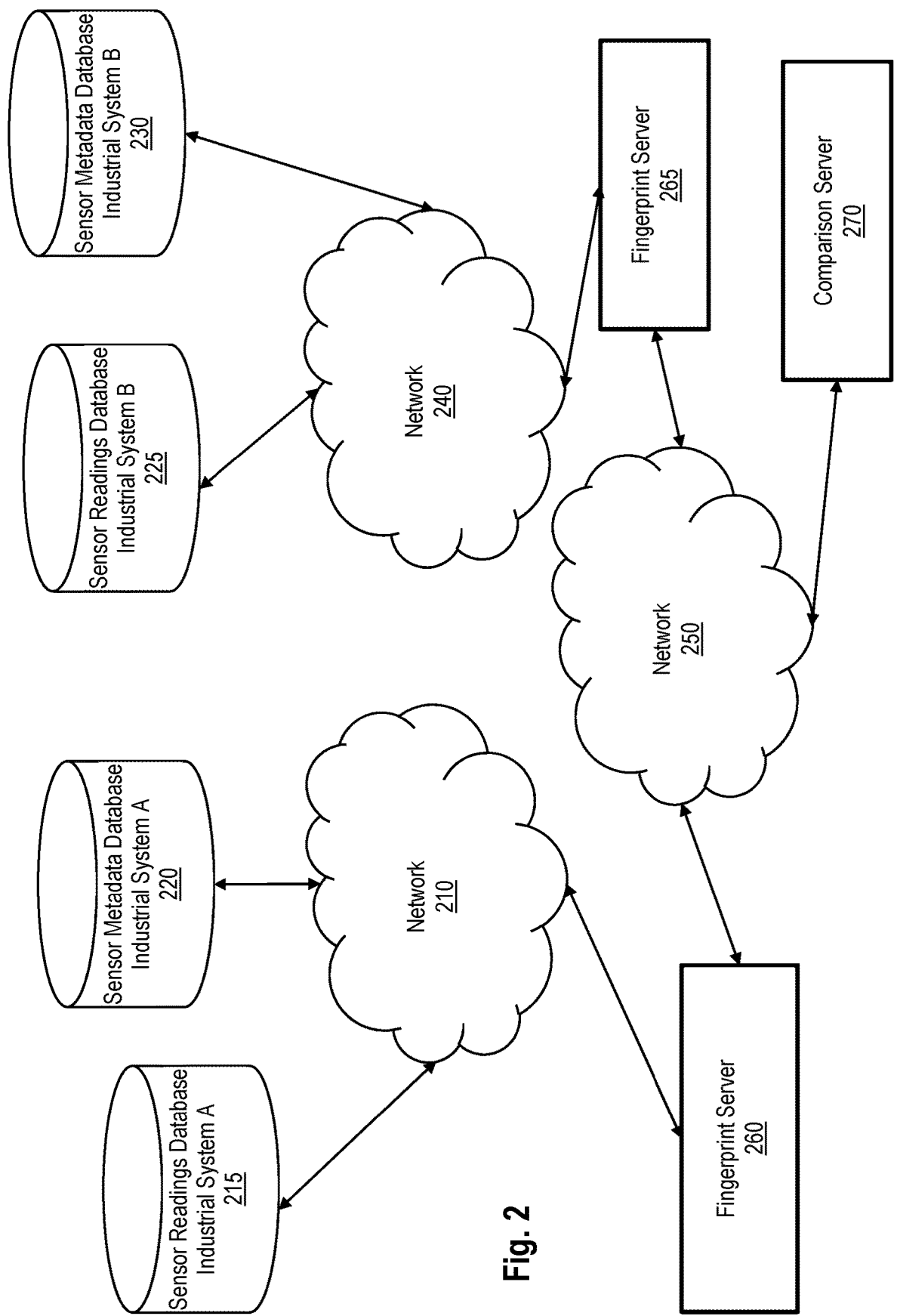
FIG. 2 is an alternative block diagram illustrating a system for identifying clusters of similar sensors, in accordance with some embodiments.

FIG. 2 is an alternative block diagram illustrating a system for identifying clusters of similar sensors, in accordance with some embodiments. An industrial system is represented in FIG. 2 that includes two separate systems, System A and System B.

Sensor readings data for System A may be obtained from sensor readings database 215, and sensor readings data for System B may be obtained from sensor readings database 225. The sensor readings data contained in sensor readings database 215 includes output from the sensors monitoring System A and sensor readings database 225 includes output from the sensors monitoring System B. Sensor readings databases 215 and 225 may also contain other production or condition data from the systems.

Sensor metadata for System A may be obtained from sensor metadata database 220, and sensor metadata for System B may be obtained from sensor metadata database 230. The sensor metadata contained in sensor metadata database 220 includes metadata related to the sensors monitoring System A and sensor metadata database 230 includes metadata related to the sensors monitoring System B. Although single sensor readings and metadata databases are shown in FIG. 2 for Systems A and B, multiple databases may be used to store the sensor readings data and metadata for Systems A and B.

The network topology illustrated in FIG. 2 may be utilized where data privacy is an issue. Network 210 is used to transmit the sensor readings data and metadata for System A from sensor readings database 215 and sensor metadata database 220 to fingerprint server 260. Similarly, network 240 is used to transmit the sensor readings data and metadata for System B from sensor readings database 225 and sensor metadata database 230 to fingerprint server 265. Networks 210 and 240 can be any suitable type of network allowing the transport of data communications. However, in situations where data security is a concern, closed or secured communication networks may be utilized or suitable security measures employed to prohibit the sharing of data between the networks. This allows the raw sensor data from Systems A and B to be kept completely separate during the sensor fingerprinting process.

In some embodiments, some of the sensor readings databases, sensor metadata databases, and fingerprinting servers can be co-located and protected behind a firewall or other computer security infrastructure. For example, sensor readings database 215, sensor metadata database 220, and fingerprint server 260 can be located in a first common location associated with System A, and sensor readings database 225, sensor metadata database 230, and fingerprint server 265 can be located in a second common location associated with System B. In other embodiments, one or more of the sensor readings databases, sensor metadata databases, and fingerprinting servers can be located remotely from each other.

Fingerprint server 260 generates fingerprints for the sensors of System A using the sensor readings data and metadata received from sensor readings database 215 and sensor metadata database 220. Likewise, fingerprint server 265 generates fingerprints for the sensors of System B using the sensor readings data and metadata received from sensor readings database 225 and sensor metadata database 230. As discussed above, the fingerprints generated by the fingerprint servers include representative characteristics of the sensor data that characterize the sensors and the corresponding equipment being monitored by the sensors.

The results from fingerprinting servers 260 and 265 are transmitted through network 250 to a comparison server 270. This shared network is the first place in this network topology where there is any contact or communication between System A and System B. In some embodiments, the data that makes up the representative characteristics of a given fingerprint may contain sensitive information that the owner of one system would not want to share with the owner of another system. Such information might include the identity and location of a given system (or even the identity of the owner of the system), or it might include specific production and downtime data. Where disclosure of such sensitive information is an issue, various techniques, such as anonymization may be used by the fingerprint servers to remove or reduce the amount of sensitive information included in fingerprints.

Communications and data stored or transmitted among the databases and servers can be encrypted using asymmetric cryptography, Advanced Encryption Standard (AES) with a 256-bit key size, or any other encryption standard known in the art.

Figure 3:
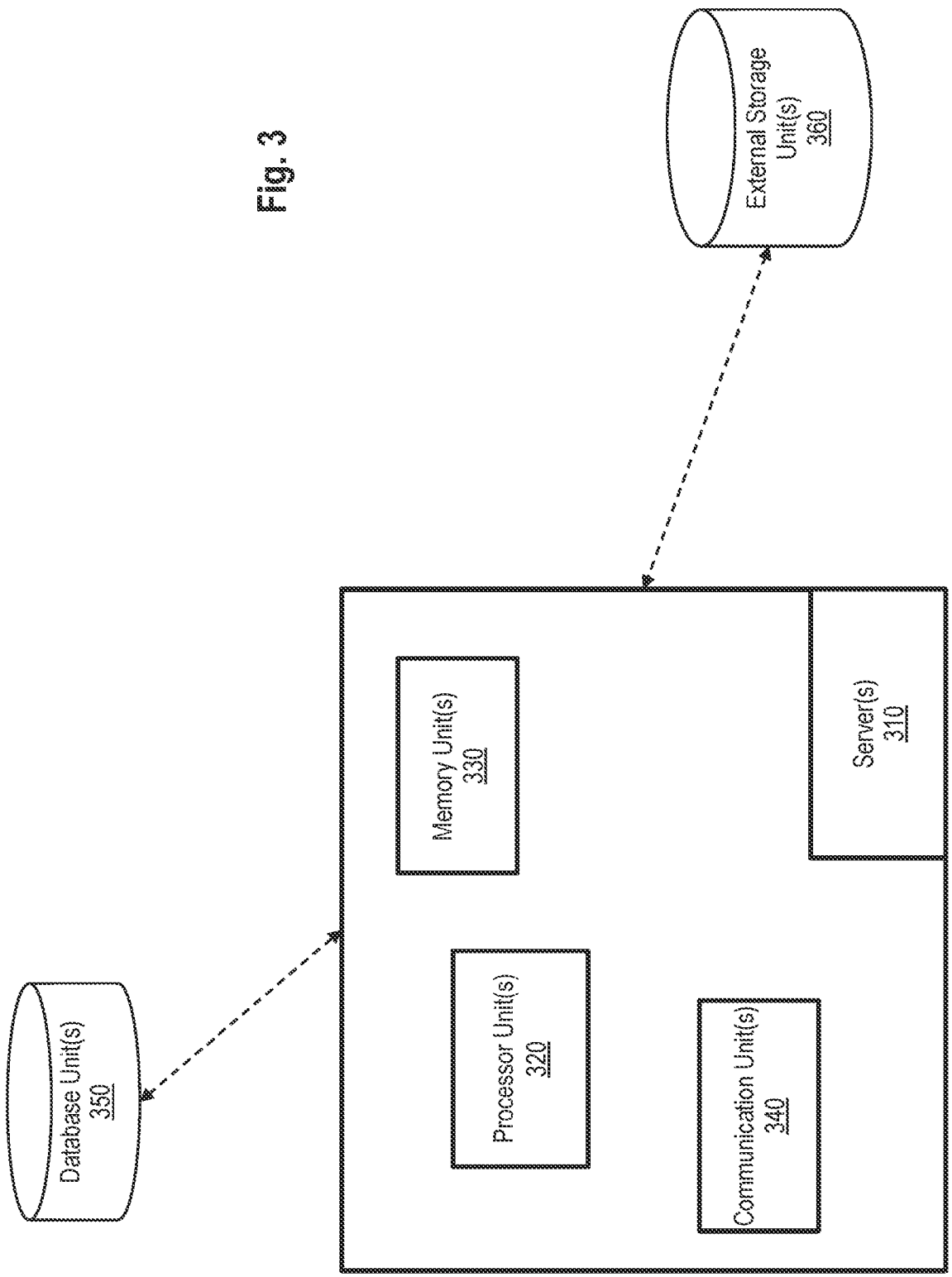
FIG. 3 is yet another alternative block diagram illustrating a system for identifying clusters of similar sensors, in accordance with some embodiments.

FIG. 3 is yet another alternative block diagram illustrating a system for identifying clusters of similar sensors, in accordance with some embodiments.

In some embodiments, one or more fingerprint/comparison units are configured to perform the functionality of the systems shown and described in FIG. 1 and FIG. 2.

In some embodiments, the fingerprint/comparison units 310 may comprise one or more processor units 320, which are coupled to one or more memory units 330. The processor units 320 and the memory units 330 are configured to implement, at least partially, the functionality of fingerprint/comparison units 310. Fingerprint/comparison units 310 may also comprise one or more communication units 340 that are configured to communicate with other units. Fingerprint/comparison units 310 may comprise other units as well.

Processor units 320 are configured to execute instructions in order to implement the functionality of fingerprint/comparison units 310. Processor units 320 are coupled to and are configured to exchange data with one or more memory units 330, which are configured to store instructions that are to be executed by processor units 320. In some embodiments, the instructions may also be stored in other non-transitory, machine-accessible storage media.

Fingerprint/comparison units 310 may be also configured to receive data, such as sensor data, for example, from one or more database units 350. Furthermore, fingerprint/comparison units 310 may be configured to output any results to one or more external storage units 360.

It should be noted that the functionality of all the units shown may be divided into additional units placed across communication buses, communication networks, etc.

Figure 4:
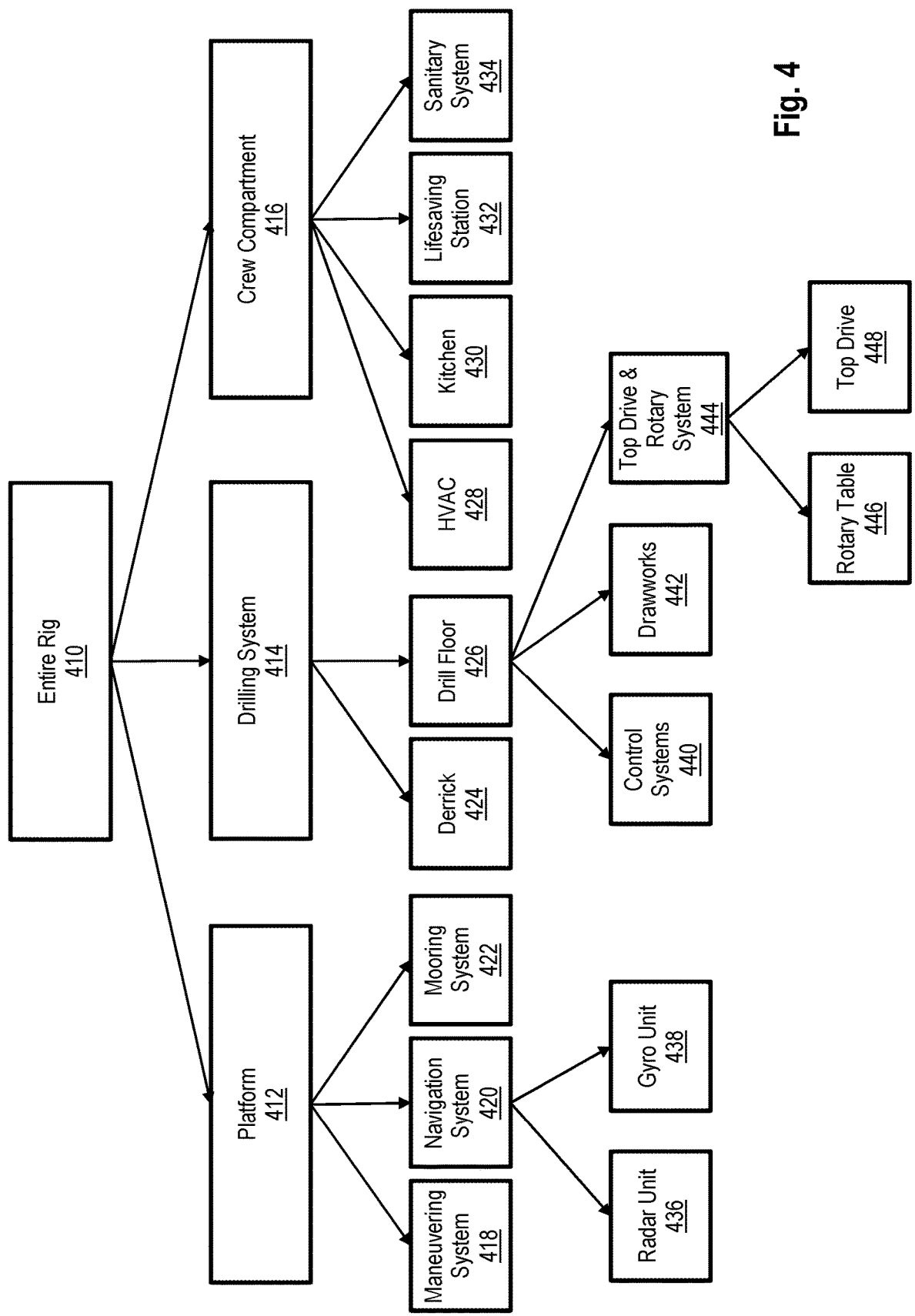
FIG. 4 is a diagram illustrating a hierarchy of components in a rig, in accordance with some embodiments.

FIG. 4 is a diagram illustrating a hierarchy of components in a rig, in accordance with some embodiments. In general, an equipment hierarchy includes an inventory or list of the equipment, parts, or components that make up an industrial system. In some embodiments, the equipment may be arranged in a hierarchical database format. The equipment hierarchy may be represented by a tree graph where nodes in the graph represent collections of equipment that share certain characteristics. For example, a node may represent equipment with the same or similar function or type. Alternatively, a node may represent the equipment contained in a particular subsystem.

Turning back to FIG. 4, rig 410 represents the entire rig in a tree graph representation of an equipment hierarchy in the case where the system is an oil rig. In this example, the nodes in the equipment hierarchy are organized in terms of the subsystems that make up the entire rig: platform 412, drilling system 414, and crew compartment 416. Each of these nodes may be further resolved into additional subsystems or the equipment that make up the subsystems. For example, platform 412 may be broken down into maneuvering system 418, navigation system 420, and mooring system 422. Navigation system 420 may be further broken down to reveal equipment associated with the navigation system, which in this case includes radar unit 436 and gyro unit 438. Drilling system 414 includes derrick 424 and drill floor 426. Drill floor 426 may be broken down into control systems 440, drawworks 442, and top drive and rotary system 444, which can be further resolved into rotary table 446 and top drive 448. Lastly, crew compartment 416 is composed of HVAC system 428, kitchen 430, lifesaving station 432, and sanitary system 434. In some embodiments, the equipment included in the equipment hierarchy may be resolved into the components that make up the equipment.

Equipment hierarchies can be used by rig operators to assist in matching similar sensors on a rig. However, this requires intensive manual classification. Additionally, different industrial parts that are the same or are similar can be difficult to determine via manual classification using equipment hierarchies because of differences in parts labels or terminology used by different manufacturers to describe equipment or contractors that installed the equipment, incomplete descriptions of equipment, or other factors such as operator errors or mistakes. Use of the presently disclosed systems and methods for matching similar sensors can expedite this process. For example, an equipment hierarchy for a rig identifies a pump under the drilling system node as "Pump 2" without further identifying information. The operational historian for the rig contains sensor information for the pump indicating that the sensor has a diurnal pattern, a yearly pattern, and general readings between −5 and 35. There are also spikes of up to 140 for brief periods when "Pump_2=ON", where the spikes grow at 1 unit per minute during sustained activity. The system described in FIG. 1 above may be used to generate a fingerprint for this sensor, which when compared against sensor fingerprints obtained from other rigs, indicates that the sensor is likely monitoring a coolant reservoir pump. Therefore, in this example it can be concluded that Pump 2 is a coolant reservoir pump.

Figure 5:
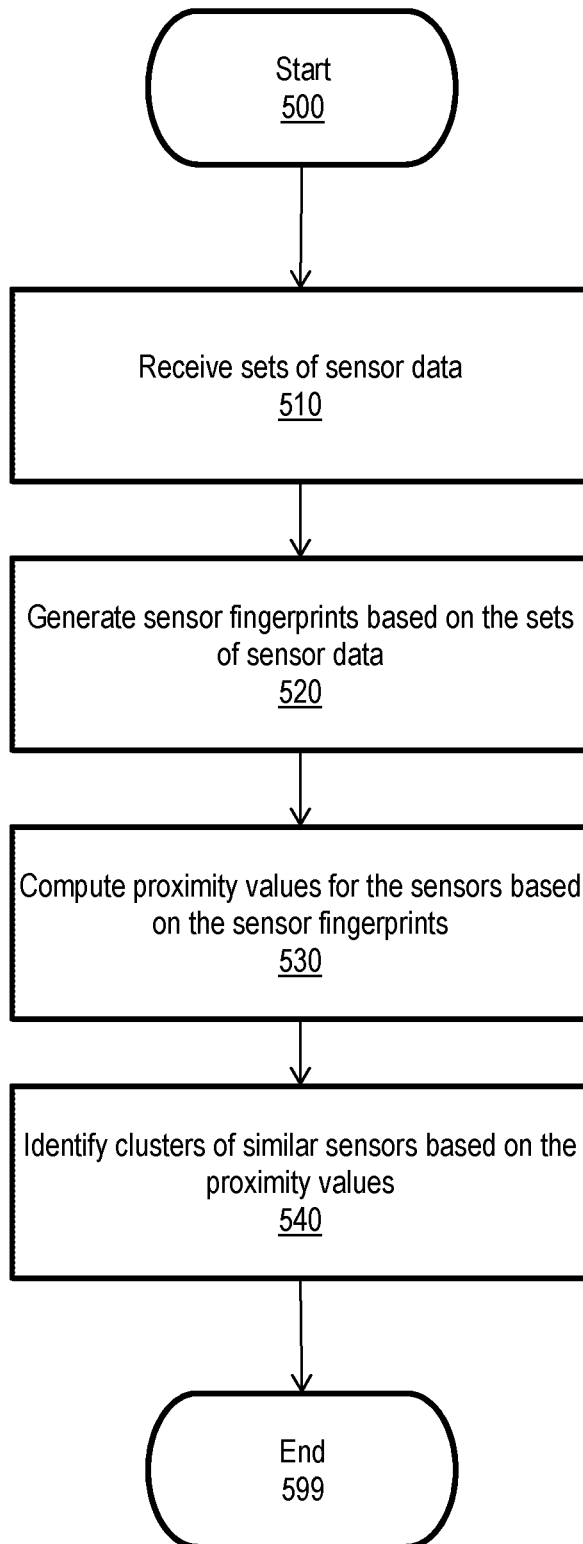
FIG. 5 is a flow diagram illustrating a method for identifying clusters of similar sensors, in accordance with some embodiments.

FIG. 5 is a flow diagram illustrating a method for identifying clusters of similar sensors, in accordance with some embodiments.

Processing begins at 500 whereupon, at block 510, sets of sensor data are received from one or more systems. Each set of sensor data may be associated with a sensor configured to monitor the one or more systems and may include sensor readings data as well as sensor metadata.

At block 520, an analysis of the sensor data is performed. A fingerprint of the sensor data is computed to represent characteristics of the sensor data. In some embodiments, the fingerprints represent a summary or decomposition of the underlying sensor readings/signals.

At block 530, proximity values for the sensors are computed. A proximity value indicates a similarity between a sensor and another sensor (or some mathematical average of sensors). In some embodiments, one or more proximity values may be computed for each sensor by comparing the fingerprint of that sensor with fingerprints from other sensors or, in other embodiments, with derivative fingerprints.

At block 540, clusters of similar sensors are identified based at least upon the sensors' proximity values.

In some embodiments, fingerprints (and thus their corresponding sensors) may be classified as belonging to the same cluster if the proximity values between the fingerprints are below a certain threshold value.

Processing subsequently ends at 599.

Figure 6:
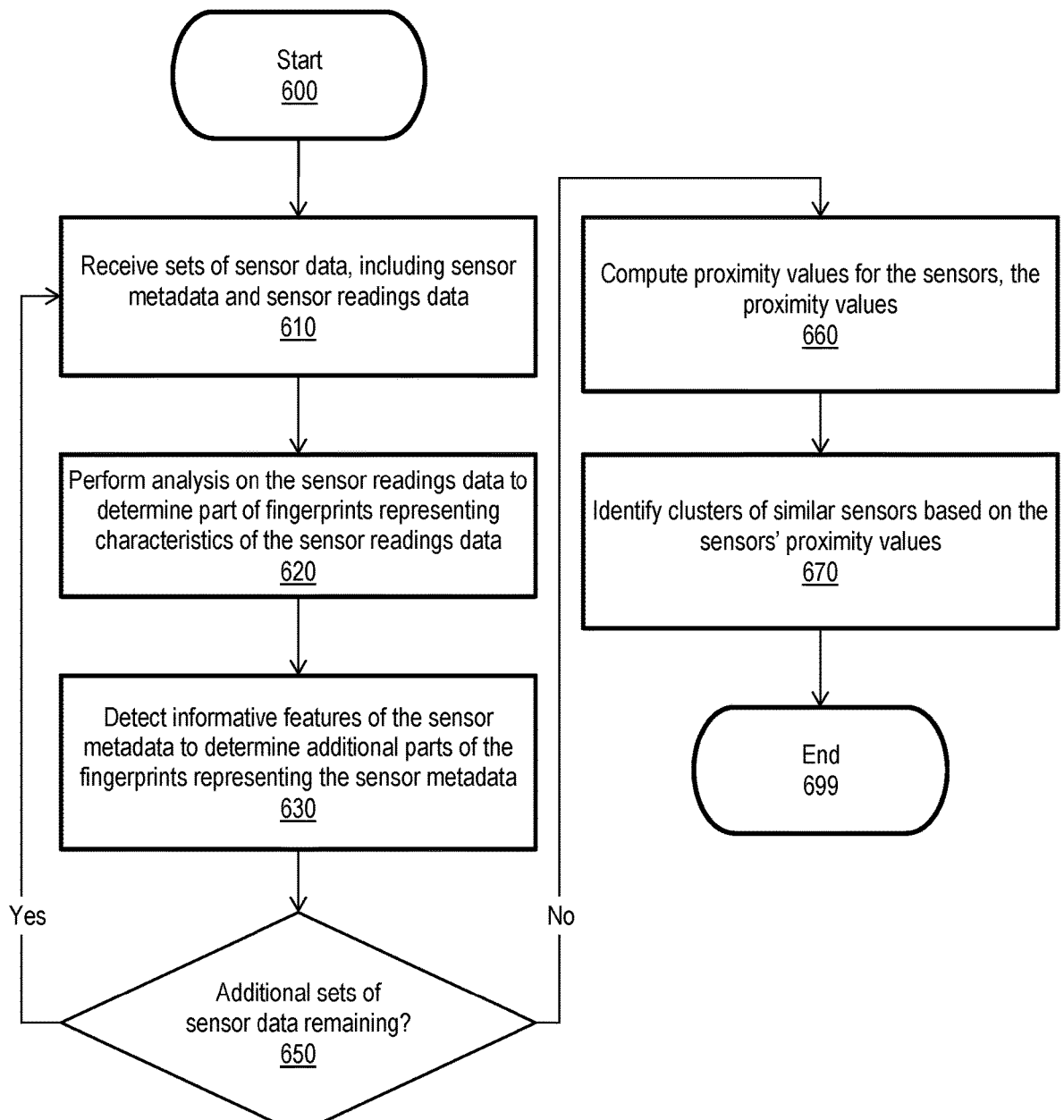
FIG. 6 is a flow diagram illustrating an alternative method for identifying clusters of similar sensors, in accordance with some embodiments.

FIG. 6 is a flow diagram illustrating an alternative method for identifying clusters of similar sensors, in accordance with some embodiments.

Processing begins at 600 whereupon, at block 610, sets of sensor data are received.

Each set of sensor data may be associated with a sensor configured to monitor equipment from one or more systems and may include sensor readings data as well sensor metadata. Sensor readings data may include various readings/signals received from the sensor such as temperature, pressure, liquid flow rate, resistance, voltage, current, etc. Sensor metadata may include various text labels and descriptions such as brand, model, description, function, warnings, etc.

In some embodiments, the sensors may be part of industrial systems, such as oil rigs. The systems may include industrial systems from other industries, such as manufacturing, natural gas, mining, and chemical industries. It should also be noted that industrial systems may include any system with equipment and sensors such as a computer server farm, for example.

Sensor data may be received from one or multiple systems. Generally, even within the same industry, sensor data from similar sensors (sensors that have substantially the same functionality and/or monitor substantially the same equipment) may appear very differently. Sensors from different systems (or even sensors from different parts within the same system) may be labeled differently, mistakenly, and at times in different languages, may have different equipment hierarchies, may have been installed by different installers, etc. Accordingly, it is generally very difficult to identify similar sensors/equipment and to classify consistently similar sensors/equipment from different systems or even similar sensors/equipment from the same system.

In some embodiments, upon collection from the various sensors, sensor data may be stored in various databases. The databases may be local to the system or the databases may be located off-site, in which case, the sensor data may be transferred to the databases via a network. In some embodiments, sensor data may also be received from databases that contain stored historical data of accumulated sensor data. In yet other embodiments, the sensor data may be received directly from the sensors.

The sensor data may be received over various types of networks, such as LANs, WANs, the Internet, SCADA networks, or other networks capable of transmitting data. In embodiments where the sensor database(s) and the data processing units are in the same physical machine, the information may be shared using system memory over internal communication busses.

In some embodiments, the data may be obtained through queries in a database querying language (such as SQL, for example) or through an API that retrieves timepoints or ranges of timepoints from the sensor data. The data may be received in a human-readable format (such as ASCII) or the data may be encoded in a defined machine-readable format (such as integer or floating numbers and/or keys to a lookup table for common long text strings). In addition, the data may be compressed and/or encrypted as needed.

At block 620, an analysis of the sensor readings data is performed. A fingerprint of the sensor readings data is computed to represent characteristics of the sensor readings data. As will be discussed further, the fingerprint for the sensor may be completed with the addition of fingerprint values derived from the sensor's metadata.

In some embodiments, various mathematical functions may be applied to the sensor readings to analyze the readings and obtain the fingerprint values. Examples of mathematical functions that may be applied/observed to generate fingerprint values may include: sharp spikes, sharp drops, minima, maxima, ranges, periodicity or other daily, weekly, or yearly patterns. Additional statistical functions such as Fourier transforms and Haar wavelet transforms may also be applied.

For example, a sensor may have readings that have a diurnal pattern, a yearly pattern, and general readings between −5 and 35. The sensor readings may also have spikes of up to 140 during brief periods when a switch is turned on, for example. All such patterns are captured and are represented in the fingerprint values. In this example, the sensor may be attached to a coolant reservoir pump. As such, once the sensor's fingerprint is known, other sensors/equipment having substantially similar fingerprints may be identified as similar sensors/equipment. Furthermore, sensor data may be collected at set intervals or at specific times of interest (for example, during a specific phase of an operation).

In some embodiments, the fingerprints represent a summary or a decomposition of the underlying sensor readings/signals.

At block 630, informative features of the sensor metadata are detected. The results for each sensor are added to the fingerprint values for that sensor. If fingerprint values from the sensor's readings exist, for example, the fingerprint values associated with the sensor's metadata are added to those existing fingerprint values.

In some embodiments, the sensor metadata may be processed at the industrial system or at another external facility using text analysis and/or natural language processing. The processing may identify unique or informative words or other data elements that may be used for the fingerprints.

In some embodiments, if the metadata is in a relatively constrained space with a limited number of words, a standard dictionary with frequency counts may be sufficient in converting the metadata to fingerprint data. For other types of metadata (for example, long descriptions of installations or errors), a most frequent informative word and count method may be applied. In yet other embodiments, a latent semantic structure analysis may be used or another similar technique of natural language processing.

In some embodiments, the metadata may be represented by fingerprint entries that are a mixture of numerical values and textual values. Textual values may be necessary, for example, in embodiments where numerical values are not adequate to represent the metadata.

In some embodiments, linear or of higher order transformations may be applied to the fingerprint values. The transformations may be applied, for example, to place the fingerprint values in certain ranges. In some embodiments, the transformations may provide weighting of the fingerprint values to assign certain values in the fingerprint a higher importance compared to other values.

In some embodiments, the transformation may be applied by multiplying the fingerprint array with another transformation array. In embodiments where the fingerprint is a mixture of numerical and text values, various if statements and other logic may be used in addition to transformation arrays.

In some embodiments where data privacy is a concern, the computation of the sensor fingerprints may be performed locally at each of the industrial systems. Only the fingerprints for the sensors may be then transmitted outside of the industrial systems. As such, the more easily identifiable, in terms of sensitive information, sensor readings data may remain locally on the industrial system, and only the less identifiable fingerprint data may be transmitted off the industrial system. Additionally, anonymization may be accomplished where the identity and location of a given industrial system (or even the identity of the owner or other information) need not be disclosed. Accordingly, sensitive information is not attributed to a particular industrial system. Thus, cautious industrial systems owners may be more willing to share their data for sensor fingerprinting.

A determination is then made, at decision 650, as to whether additional sets of sensor data remain to be analyzed. If additional sets of sensor data remain, decision 650 branches to the "yes" branch, where the processing of additional sets of sensor data continues at block 610.

Otherwise, if no additional systems with sensors remain, decision 650 branches to the "no" branch whereupon, at block 660, proximity values for the sensors are computed. The proximity value indicates a similarity between a sensor and another sensor (or some mathematical average of sensors as will be discussed further).

In some embodiments, one or more proximity values may be computed for each sensor by comparing the fingerprint of that sensor with fingerprints from other sensors or, in other embodiments, with derivative fingerprints.

In some embodiments, the sensor fingerprint for each sensor may consist of n numbers, each number corresponding to a characteristic of the sensor as determined by the readings data, the metadata, etc. Accordingly, each fingerprint may be considered a point in an n-dimensional space of the n sensor characteristics. A proximity value may be then represented as the distance in the n-dimensional space between the sensor fingerprint and another fingerprint.

If a fingerprint a has fingerprint values $a_i$ and fingerprint b has fingerprint values $b_i$ (where i=1, 2, . . . , n) in the n-dimensional characteristics space, the distance D between the two fingerprint is given by:

$$D=\sqrt{\Sigma_{i=1}^{n}(a_i-b_i)^2}.$$

In some embodiments, the fingerprint may be an array of higher order. For example, some of the mathematical functions applied to the sensor data may generate complex values and thus give rise to fingerprints that are of n×2 order. In such embodiments, the fingerprint may be converted to a 2n×1 array and treated similarly to an n×1 array, for example.

In embodiments where the fingerprints are a mixture of numerical values and textual information, a combination of a distance and various logic (such as "if" statements) may be used to determine a proximity value. In some embodiments, a latent sematic structure or other natural language processing may be applied to the textual information to determine the proximity value. In embodiments where substantial correlation exists between sensors (for example, redundant sensors from the same industrial system), auto correlation functions may also be used.

In some embodiments, the fingerprint of a sensor may be compared to derivative fingerprints, which are fingerprints that are derived from other fingerprints. For example, a derivative fingerprint may be formed by computing the average location in the n-dimensional space of a group of fingerprints in the same cluster.

At block 670, clusters of similar sensors are identified based at least upon the sensors' proximity values.

In some embodiments, fingerprints (and thus their corresponding sensors and/or equipment) may be classified as belonging to the same cluster if the proximity values between the fingerprints are below a certain threshold value.

In some embodiments, once a cluster is established, a derivative fingerprint may be computed for that cluster. For example, a derivative fingerprint for a cluster may be computed by calculating an average location in the n-dimensional space for the fingerprints in the cluster, which may be thought of as a "center" of the cluster. In some embodiments, the average location fingerprint may have components in the n-dimensional space that are each an average of the equivalent component of the fingerprints in that dimension.

As new sensors/fingerprints are processed, a proximity value for those fingerprints may be computed by calculating the distance between the fingerprint and the derivative average fingerprint for each cluster. A cluster assignment may be then made if a sensor has a proximity value from the "center" of the cluster that is less than a certain threshold value. In some embodiments, once a proximity value is below the threshold for a certain cluster, the computation of additional proximity values (and the corresponding search for another cluster) may stop.

In addition to the creation of sensor clusters, clusters of similar equipment may also be identified based at least upon the identification of similar clusters for the sensors attached to that equipment.

Processing subsequently ends at 699.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A computer-implemented method comprising:
   receiving a set of sensor data comprising at least one of sensor readings data and sensor metadata associated with a sensor configured to monitor equipment;
   generating a sensor fingerprint for the sensor based at least in part on the set of sensor data;
   computing at least one proximity value for the sensor, wherein computing the at least one proximity value comprises comparing the sensor fingerprint to another fingerprint which is at least one of another sensor fingerprint and a derivative fingerprint derived from a plurality of other sensors; and
   identifying a similarity cluster for the sensor based at least upon the at least one proximity value for the sensor;
   wherein the sensor fingerprint and the other fingerprint are points in an n-dimensional space;
   wherein each of the n-dimensions corresponds to a characteristic of the set of sensor data; and
   wherein the proximity value is a distance in the n-dimensional space between the sensor fingerprint and the other fingerprint.

2. The method of claim 1, wherein the characteristic of the set of sensor data is at least one of: sharp spikes, changes, ranges, periodicity, Fourier transforms, Haar transforms, max, min, mean, time periods of collection, natural language processing, text analysis, identify informative words, mode, summarizing arithmetic functions, and other transforms.

3. The method of claim 1, further comprising identifying an equipment similarity cluster for the equipment based at least upon the identifying the similarity cluster.

4. A system comprising:
   one or more processing units; and
   one or more memory units coupled to the one or more processing units, wherein:
   the one or more memory units are configured to store instructions,
   the one or more processing units are configured to execute the instructions causing the system to perform operations comprising:
   receiving a set of sensor data comprising at least one of sensor metadata and sensor readings data associated with a sensor configured to monitor equipment;
   generating a sensor fingerprint for the sensor based at least in part on the set of sensor data;
   computing at least one proximity value for the sensor, wherein computing the at least one proximity value comprises comparing the sensor fingerprint to another fingerprint which is at least one of another sensor fingerprint and a derivative fingerprint derived from a plurality of other sensors; and identifying a similarity cluster for the sensor based at least upon the at least one proximity value for the sensor;

wherein the sensor fingerprint and the other fingerprint are points in an n-dimensional space;

wherein each of the n-dimensions corresponds to a characteristic of the set of sensor data; and wherein the proximity value is a distance in the n-dimensional space between the sensor fingerprint and the other fingerprint.

5. The system of claim 4, wherein the characteristic of the set of sensor data is at least one of: sharp spikes, changes, ranges, periodicity, Fourier transforms, Haar transforms, max, min, mean, time periods of collection, natural language processing, text analysis, identify informative words, mode, summarizing arithmetic functions, and other transforms.

6. The system of claim 4, the operations further comprising identifying an equipment similarity cluster for the equipment based at least upon the identifying a similarity cluster.

7. At least one non-transitory, machine-accessible storage medium having instructions stored thereon, wherein the instructions are configured, when executed on a machine, to cause the machine to perform operations comprising:

receiving a set of sensor data comprising at least one of sensor metadata and sensor readings data associated with a sensor configured to monitor equipment;

generating a sensor fingerprint for the sensor based at least in part on the set of sensor data;

computing at least one proximity value for the sensor, wherein computing the at least one proximity value comprises comparing the sensor fingerprint to another fingerprint which is at least one of another sensor fingerprint and a derivative fingerprint derived from a plurality of other sensors; and identifying a similarity cluster for the sensor based at least upon the at least one proximity value for the sensor;

wherein the sensor fingerprint and the other fingerprint are points in an n-dimensional space;

wherein each of the n-dimensions corresponds to a characteristic of the set of sensor data; and wherein the proximity value is a distance in the n-dimensional space between the sensor fingerprint and the other fingerprint.

8. The storage medium of claim 7, the operations further comprising identifying an equipment similarity cluster for the equipment based at least upon the identifying a similarity cluster.

* * * * *